Patented Jan. 23, 1923.

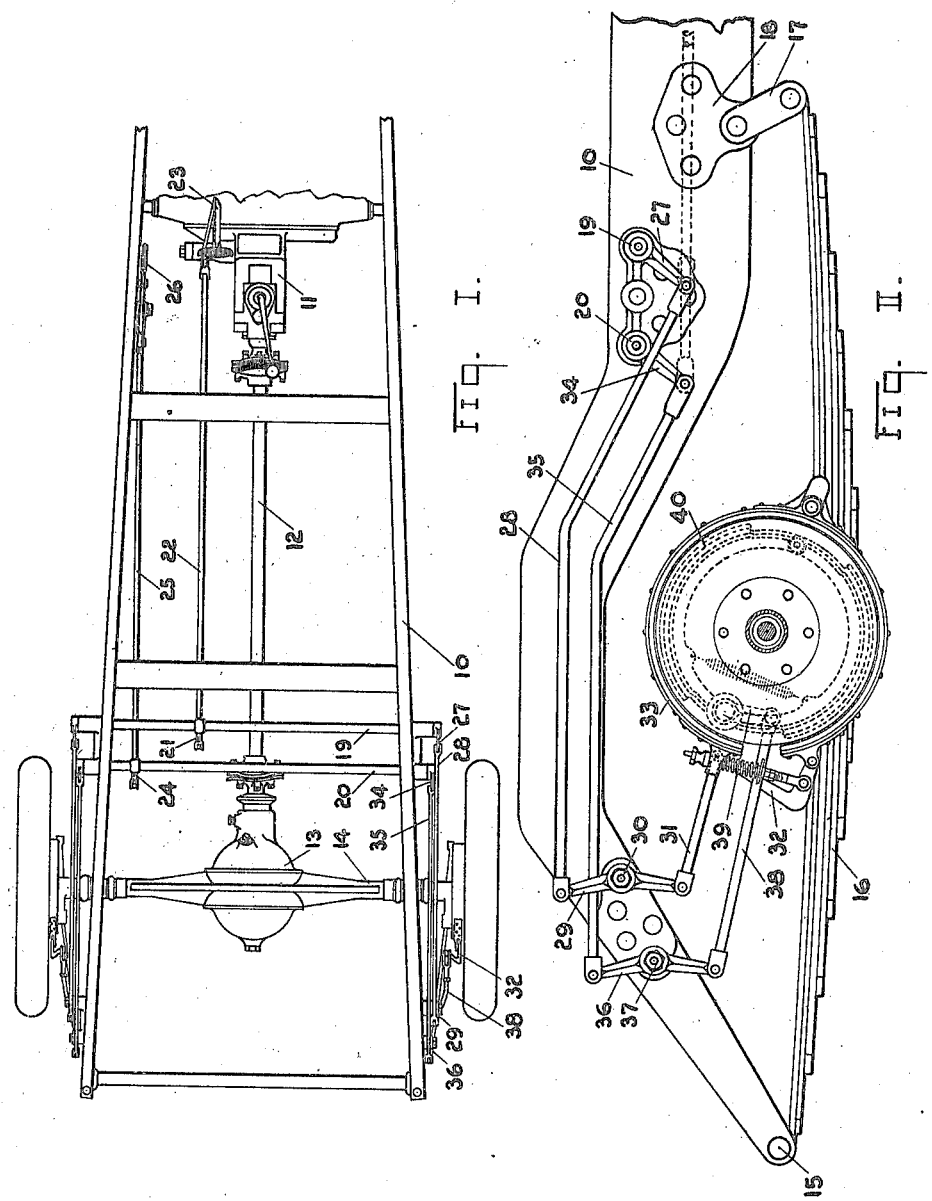

1,442,957

UNITED STATES PATENT OFFICE.

ALLEN LOOMIS, OF TOLEDO, OHIO, ASSIGNOR TO THE WILLYS-OVERLAND COMPANY, OF TOLEDO, OHIO, A CORPORATION OF OHIO.

SPRING SUSPENSION AND BRAKE-OPERATING MECHANISM.

Application filed February 3, 1921. Serial No. 442,111.

*To all whom it may concern:*

Be it known that I, ALLEN LOOMIS, residing at Toledo, county of Lucas, and State of Ohio, have invented certain new and useful Improvements in Spring Suspension and Brake-Operating Mechanism, of which I declare the following to be a full, clear, and exact description.

This invention relates to improvements in the spring suspension and brake operating mechanism of automobiles.

It has been common in automobiles heretofore to employ a semi-elliptic spring suspension, or its equivalent, for the rear axle, the forward ends of the springs being pivoted to the frame or a bracket on the frame and the rear ends being pivoted to a shackle which in turn is pivoted to the frame at or near the rear end thereof. The brake operating mechanism ordinarily comprises at least one rod which extends from the axle forwardly to a lever pivoted on the frame slightly in the rear of the spring bracket. The axle, which is mounted upon the spring, and therefore swings substantially in an arc about the said bracket, changes its distance from the said lever during the movements of the axle only slightly and not enough to interfere with the proper operation of the brake.

This style of spring suspension, however, does not give the best results in so far as the conversion of the power of the engine into tractive effort is concerned. When one of the rear wheels passes over an obstruction it is raised by the obstruction. In descending again upon the forward side of the obstruction the wheel swings in an arc about the forward bracket of the spring, and this arc takes the wheel down out of contact with the forward side of the obstruction. In other words the wheel transmits no tractive effort after it leaves the top of the obstruction until it has reached the bottom thereof.

In my invention this difficulty is overcome by the mounting of the axle to swing about a pivot bracket in the rear of the axle. Then, as a rear wheel rides over the top of an obstruction and descends upon the forward side thereof, it is actually held against the surface of the obstruction and is able to exert tractive effort. It is not practicable to take advantage of this construction, however, with the ordinary mounting of the brake operating mechanism, for the reason that when the brake operating mechanism is on the side of the axle opposite from that of the pivot about which the axle swings the tendency of the brake to set with each movement of the axle is increased to such an extent as to be highly objectionable. In carrying out my invention therefore I have devised a mounting for the brake mechanism, the direct connection of which with the frame is toward the rear of the axle, and therefore upon the side of the spring pivot. In this manner I avoid any interference with the proper action of the brake mechanism.

Consequently the principal object of my invention is the provision of a rear spring and axle mounting for automobiles which shall enable the rear wheel to exert tractive effort at all times even when traveling over rough roads, and at the same time to so arrange the brake actuating mechanism that it will function properly when used with such a spring mounting.

Objects relating to details of construction, and other objects, will appear as I proceed with the description of that embodiment of the invention which, for the purposes of the present application, I have illustrated in the accompanying drawing, in which:

Figure I is a plan view of the rear portion of an automobile chassis in which my invention is employed.

Figure II is a side elevation of the construction with the wheel omitted.

In the drawings 10 indicates the side members of an automobile frame. 11 is the transmission casing and 12 the propeller shaft. The latter at its rear end is mounted rotatably in a gear case 13 forming part of a rear axle 14. At the rear end of each frame member 10 is a pivot 15 upon which is mounted the rear end of the corresponding spring 16, the front end being pivoted to a shackle 17 which in turn is pivoted to a bracket 18 on the frame member 10. The axle 14 is supported upon the springs 16 about midway of the length of the latter.

19 and 20 are rock shafts mounted in the frame members 10 and extending therethrough at each end. A crank 21 fixed upon the shaft 19 is adapted to be shifted back and forth by a rod 22 which is connected to a foot lever 23. A similar crank 24 and rod 25 serve to actuate the rock shaft 20 when a hand lever 26 is moved back and forth. The levers 23 and 26 may be the usual service and emergency brake levers.

On each end of the shaft 19 outside of the frame there is a crank 27 to which is pivoted a connecting rod or link 28. At its rear end the rod 28 is pivoted to one arm of a lever 29 which is pivotally mounted on the frame at 30, the opposite end of the lever being connected by a link 31 with a lever 32 by means of which the outer brake band 33 may be tightened. In a similar manner each outer end of the rock shaft 20 is connected by a crank 34, rod 35, lever 36 pivoted to the frame at 37, and link 38, with a crank 39 by means of which the inner brake band 40 may be expanded. The brake construction illustrated is an example of a well known and commonly used form, but it should be understood that other types of rear wheel brakes may be equally well employed in my invention.

The operation of the invention will be obvious from the above description. When the machine is in motion the rear wheels are constantly moving up and down with respect to the frame because of inequalities and obstructions in the road. The axle is necessarily fixed upon the springs, and as the latter are pivoted at the rear the wheels must move substantially in an arc about the pivots 15. If the lever and crank 32, 39 and the links 31 and 38 were located on the forward side of the axle, as in the usual construction, every movement of the wheel downward from the position illustrated in Fig. II would tend to pull on the links 31, 38 and set the brakes. There is a tendency towards this result in the usual construction and also in the structure shown in the drawings, but it is small enough so that the brakes are never actually set. However, this effect would be so greatly increased with my spring mounting and the usual arrangement of brake mechanism as to cause the brakes to actually grip the brake drum at times and such a condition would, of course, be sufficiently objectionable to counteract the advantages gained from my spring mounting.

While I have shown and described in considerable detail a certain specific embodiment of the invention it is to be understood that this showing and description are illustrative only and for the purpose of rendering the invention clear, and that I do not regard the invention as limited to the details of the construction illustrated and described, or any of them, except in so far as I have included such limitations within the terms of the following claims, in which it is my intention to claim all novelty inherent in the invention broadly as well as specifically.

What I claim as new and desire to secure by Letters Patent is:

1. A spring suspension for the rear axle of an automobile comprising a pair of semi-elliptic springs pivoted at their rear ends to the frame of the automobile and at their forward ends to shackles upon the frame, in combination with brake mechanism mounted upon said axle and operatively connected with the frame behind the axle.

2. A spring suspension for the rear axle of an automobile comprising a pair of semi-elliptic springs pivoted at their rear ends to the frame of the automobile and at their forward ends to shackles upon the frame, in combination with brake mechanism mounted upon said axle, levers pivoted to the frame behind the axle, links connecting said levers with said brake mechanism, and means for operating said levers.

3. A spring suspension for the rear axle of an automobile, comprising a pair of semi-elliptic springs pivoted at their rear ends to the frame of the automobile and at their forward ends to shackles upon the frame, in combination with brake mechanism mounted upon said axle, and a link and lever connection between said mechanism and the frame behind said axle.

4. A spring suspension for automobiles, comprising a pair of semi-elliptic springs each pivoted at one end to an end of the automobile frame and at the opposite end to a pivot supported upon the frame and movable longitudinally thereof, and an axle mounted midway of the ends of the spring, brake mechanism mounted upon the axle and a link and lever connection between said mechanism and the frame between the end thereof and the said axle.

5. In an automobile, a frame, axle located at a short distance from one end of the frame, brake mechanism on said axle, a lever and link connection between the brake and the frame on the side towards the end of the frame, and operating rods extending from said connection to the opposite side of the axle.

6. In an automobile, a frame, a rear axle located at a short distance forward of the rear end of the frame, a brake mechanism on said axle, a lever and link connection between the brake mechanism and the frame behind the axle, operating rods extending forward from the said connection to a position accessible to the driver, said rods being elevated as they pass above said axle.

7. In an automobile, a frame, a rear axle located at a short distance forward of the rear end of the frame, a brake mechanism on said axle, a lever and link connection between the brake mechanism and the frame behind the axle, operating rods extending forward from the said connection outside of the frame to a position slightly in advance of the axle, and then inwardly of the frame to a position accessible to the driver of the automobile.

8. In a vehicle, a frame, an axle, road wheels connected therewith, resilient connecting means between said axle and said frame for causing said axle to move relative to said frame in an arcuate path about a point to the rear of said axle, brake mechanism for said wheels and operating means therefor connected to said frame at a point rearward of said axle.

In testimony whereof, I affix my signature.

ALLEN LOOMIS.